(12) United States Patent
Al-Rawi et al.

(10) Patent No.: US 7,633,849 B1
(45) Date of Patent: Dec. 15, 2009

(54) CODED OFDM SYSTEM USING ERROR CONTROL CODING AND CYCLIC PREFIX FOR CHANNEL ESTIMATION

(75) Inventors: Ghazi Al-Rawi, Stanford, CA (US); Ahmad R. S. Bahai, Lafayette, CA (US); Tareq Al-Nafouri, Stanford, CA (US); John Cioffi, Atherton, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1158 days.

(21) Appl. No.: 10/218,094

(22) Filed: Aug. 13, 2002

(51) Int. Cl.
*H04J 11/00* (2006.01)

(52) U.S. Cl. .................... 370/208; 370/389

(58) Field of Classification Search ........ 370/203–210, 370/212, 213, 491, 221, 222, 260, 349, 389; 375/130, 147, 316, 206, 222, 260, 221, 346
See application file for complete search history.

(56) References Cited

U.S. PATENT DOCUMENTS

| 6,181,714 | B1* | 1/2001 | Isaksson et al. ............. 370/491 |
| 6,396,886 | B1 | 5/2002 | Kapoor |
| 6,408,022 | B1* | 6/2002 | Fertner ...................... 375/230 |
| 6,678,318 | B1 | 1/2004 | Lai |
| 6,687,291 | B1 | 2/2004 | Lee et al. |
| 6,693,984 | B1* | 2/2004 | Andre ........................ 375/350 |
| 6,912,258 | B2* | 6/2005 | Birru ........................... 375/340 |
| 7,173,967 | B2 | 2/2007 | Blinn et al. |
| 2002/0044524 | A1* | 4/2002 | Laroia et al. ................ 370/203 |

* cited by examiner

*Primary Examiner*—Brenda Pham (57) ABSTRACT

An apparatus for demodulating a coded orthogonal frequency division multiplexing (OFDM) signal in a coded OFDM receiver. The coded OFDM signal comprises systematic bits, error control bits, and a cyclic prefix. The apparatus performs channel estimation quickly and accurately using the error control bits, the channel spread constraint, and the cyclic prefix portion of the received coded OFDM signal.

25 Claims, 4 Drawing Sheets

FIG. 4

CODED OFDM SYSTEM USING ERROR CONTROL CODING AND CYCLIC PREFIX FOR CHANNEL ESTIMATION

TECHNICAL FIELD OF THE INVENTION

The present invention relates generally to wireless communication devices and, more particularly, to an apparatus and a related method using error control codes and cyclic prefix information to perform channel estimation in a coded orthogonal frequency division multiplexing (OFDM) receiver.

BACKGROUND OF THE INVENTION

Orthogonal frequency division multiplexing (OFDM) is an effective multicarrier modulation technique for mitigating the effect of inter-symbol interference (ISI) in frequency-selective wireless channels. In wireless OFDM systems, the use of differential phase-shift keying (DPSK) eliminates the need for channel estimation at the receiver. However, DPSK limits the number of bits per symbol and results in a 3 dB loss in signal-to-noise ratio (SNR).

If the channel is estimated at the receiver, coherent detection may be used. This permits the use of more efficient multi-amplitude signaling schemes. If the channel state changes slowly, reference pilot symbols or decision-directed channel tracking techniques may be used. On the other hand, if the channel state can change significantly from one symbol to the next due to high Doppler frequency, channel estimation within a single OFDM symbol may be required. This can be achieved using L pilot tones equally spaced across the N sub-channels in the frequency domain.

OFDM systems usually use coding and interleaving across sub-channels to exploit frequency diversity in frequency selective channels. Blind channel estimation techniques allow higher data rates because there is no overhead caused by training symbols. Most of the traditional blind channel estimation techniques, however, ignore the coding information and thus require a large number of OFDM symbols to achieve a sufficiently accurate estimate of the channel. This requirement not only introduces a significant latency in the system, but also limits these techniques to slowly varying channels.

Therefore, there is a need in the art for improved coded orthogonal frequency division multiplexing (OFDM) receivers. In particular, there is a need for improved OFDM receivers that can perform channel estimation within as little as a single symbol and using the minimum possible number of pilots, if any.

SUMMARY OF THE INVENTION

The present invention provides an iterative apparatus and method for joint soft decoding and channel estimation. The iterative technique employed by the present invention provides an accurate blind or semi-blind channel estimate within a single OFDM symbol. Therefore, an OFDM receiver according to the principles of the present invention uses minimum training overhead, has zero-latency, and is more appropriate for fast time-varying channels.

The present invention uses the soft estimates of the decoded symbols in an iterative way. As with most hill-climbing techniques, in the blind case, the proposed iterative algorithm can potentially get trapped in local minima or stationary points. Running the algorithm multiple times starting from different random initial conditions alleviates this problem. Then, the results of the best trial are adopted. To increase robustness and speed up convergence, a semi-blind approach may be adopted, wherein L pilot tones equally spaced among the N sub-channels are used to obtain an initial channel estimate for the iterative algorithm.

Various iterative blind channel estimation techniques that exploit coding information have been suggested. Most of these techniques target single-carrier systems and consequently have to deal with complicated time-domain equalization. On the other band, because of the cyclic prefix, equalization in multi-carrier systems is trivial. This makes adaptive equalization techniques even more attractive in these systems.

The proposed channel estimation technique is based on the EM algorithm and is performed in the time domain, thereby exploiting the channel length constraint, as well as the extra observation offered by the cyclic prefix. The information contained in the cyclic prefix observation has been used in the past for timing and frequency synchronization and for channel tracking in multi-carrier modulation systems.

To address the above-discussed deficiencies of the prior art, it is a primary object of the present invention to provide, for use in a coded orthogonal frequency division multiplexing (OFDM) receiver, an apparatus for demodulating a coded OFDM signal comprising systematic bits, error control bits, and a cyclic prefix. According to an advantageous embodiment of the present invention, the apparatus performs channel estimation using the error control bits and the cyclic prefix in the coded OFDM signal.

According to one embodiment of the present invention, the apparatus comprises N equalizers capable of receiving a first N samples of the coded OFDM signal and generating therefrom N equalized outputs, wherein the N equalized outputs are equalized according to a plurality of tap weighting coefficients applied to the N equalizers.

According to another embodiment of the present invention, the apparatus further comprises a decoding circuit block capable of receiving and error-correcting the N equalized outputs, wherein the decoding circuit block outputs N soft decision values, wherein each of the N soft decision values comprises a probability value associated with an estimated value of a data symbol in the coded OFDM signal.

According to still another embodiment of the present invention, the apparatus further comprises a channel estimator capable of receiving the coded OFDM signal and generating the plurality of tap weighting coefficients applied to the N equalizers, wherein the channel estimator generates the plurality of tap weighting coefficients as a function of the received coded OFDM signal, including the cyclic prefix, and the N soft decision values.

According to yet another embodiment of the present invention, the decoding circuit block determines the N soft decision values as a function of the soft decision values of the error control bits and systematic data bits, as well as the structure and the type of the error control code itself.

According to a further embodiment of the present invention, the apparatus further comprises circuitry for determining a difference between each of the N equalized outputs and a corresponding one of the N soft decision values and outputting N difference values.

According to a still further embodiment of the present invention, the circuitry for determining the difference between the each one of the N equalized outputs and the corresponding soft decision value subtracts each one of the N equalized outputs from the corresponding soft decision value.

According to a yet further embodiment of the present invention, the channel estimator receives the N difference values and generates the plurality of tap weighting coefficients as a function of the received OFDM signal, including the cyclic prefix, and the N difference values.

In one embodiment of the present invention, the N equalizers perform equalization in the frequency domain and the N equalized outputs comprise frequency domain signals.

In another embodiment of the present invention, the channel estimator performs channel estimation in the time domain in order to benefit from the information in the cyclic prefix portion of the received coded OFDM signal and the channel delay spread constraint. The tap weighting coefficients are time domain signals that are later transformed to frequency domain to obtain the values of the weighting coefficients for the N single-tap equalizers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless local area network (LAN) receiver, broadcast network receiver, or other type of coded OFDM receiver.

Figure 1:
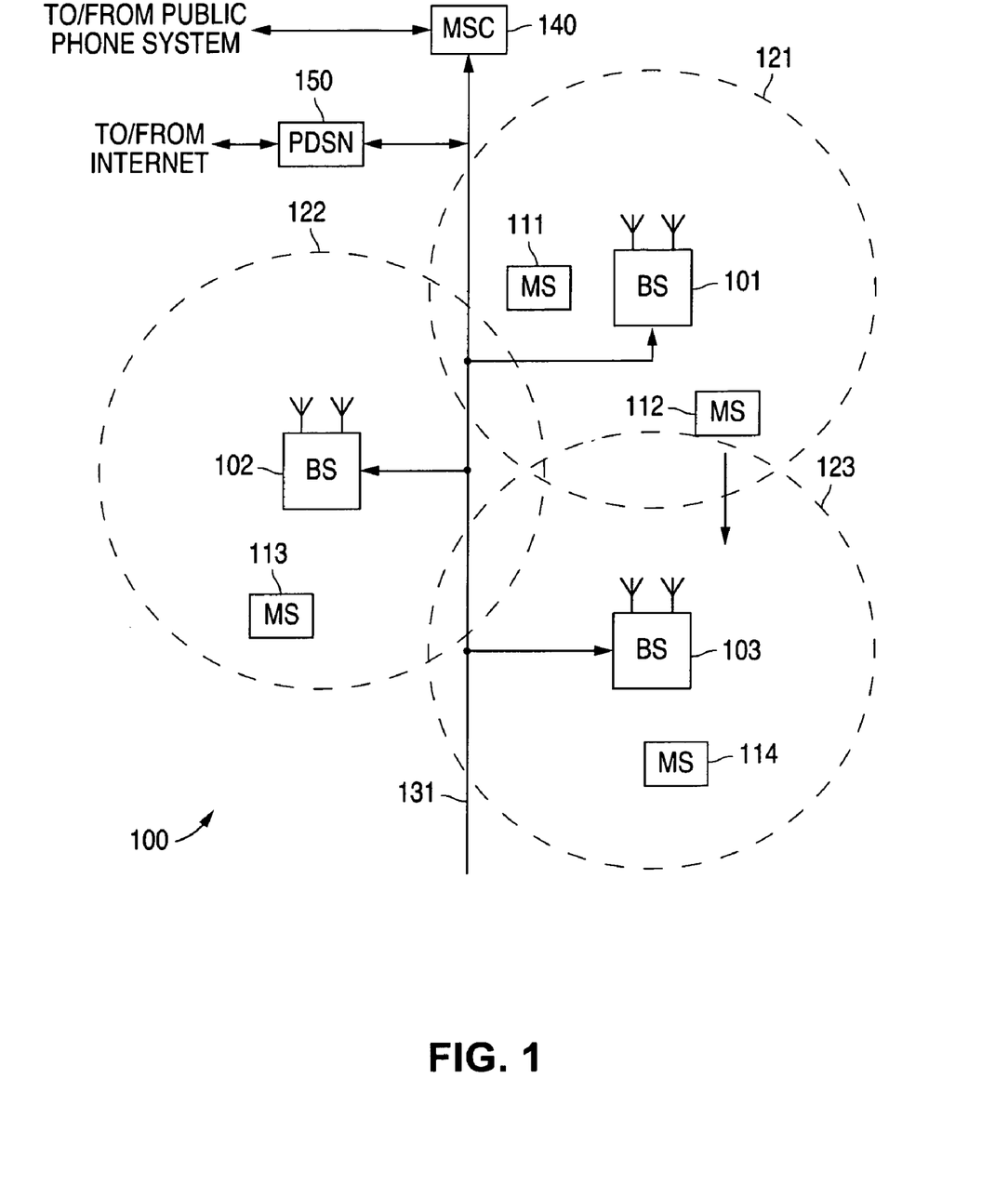
FIG. 1 illustrates an exemplary wireless network in which mobile station receivers using channel estimation techniques according to the principles of the invention may be used.

FIG. 1 illustrates exemplary wireless network 100, in which mobile station receivers using channel estimation techniques according to the principles of the present invention may be used. According to the exemplary embodiment, wireless network 100 is a relatively high-frequency wireless local area network (LAN) that permits multiple access devices to wirelessly access a data network. Wireless network 100 comprises a plurality of cell sites 121-123, each containing a base station (BS), such as BS 101, BS 102, or BS 103. Base stations 101-103 communicate with a plurality of mobile stations (MS) 111-114 using orthogonal frequency division multiplexing (OFDM) techniques.

Mobile stations 111-114 may be any suitable wireless devices, including personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site.

BS 101, BS 102 and BS 103 transfer data signals between each other and the public switched telephone network (PSTN) (not shown) and the Internet via communication line 131, mobile switching center (MSC) 140, and packet data serving node (PDSN) 150. MSC 140 is a switching device that provides services and coordination between the subscribers in a wireless network and external networks, such as the PSTN or Internet.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

In the embodiment described above, wireless network 100 is a relatively high-frequency wireless local area network (LAN) that provides wireless access to a data network to multiple access devices. However, this embodiment should not be construed so as to limit the scope of the present invention. Those skilled in the art will recognize that a receiver that performs channel estimation according to the principles of the present invention may be implemented in a number of different ways. For example, in one alternate embodiment of the present invention, wireless network 100 may be, for example, a broadcast network, such as a high-definition television network or an audio (i.e., commercial radio) network that broadcasts a coded OFDM signal to multiple subscriber television sets that contain receivers that perform channel estimation according to the principles of the present invention.

Figure 2:
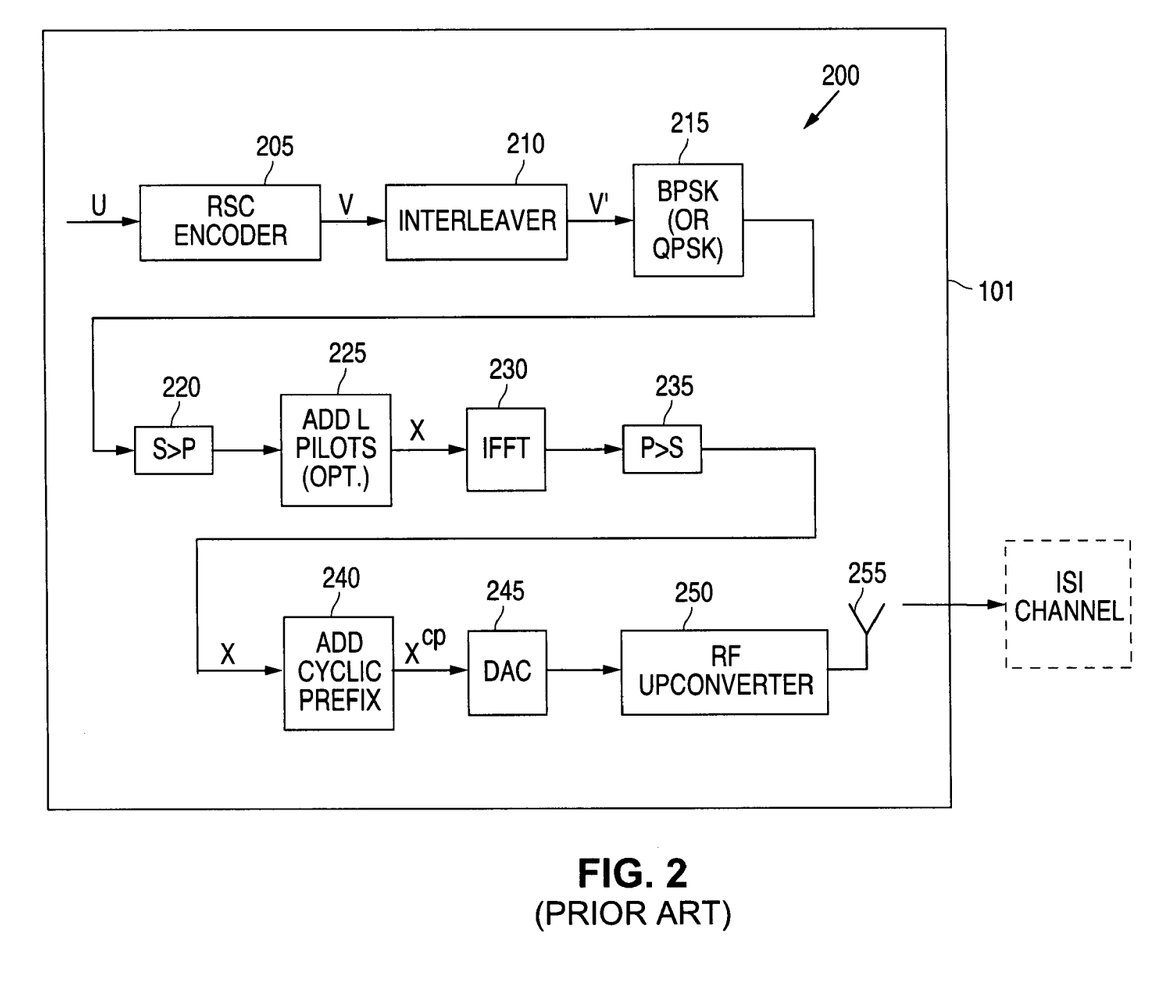
FIG. 2 is a high-level block diagram of a conventional coded orthogonal frequency division multiplexing (OFDM) transmitter according to an exemplary embodiment of the prior art.

FIG. 2 is a high-level block diagram of conventional coded orthogonal frequency division multiplexing (OFDM) transmitter 200 in base station 101 according to an exemplary embodiment of the prior art. OFDM transmitter 200 comprises four-state recursive systematic convolutional (RSC) encoder 205, random interleaver 210, binary phase shift keying (BPSK) block 215, serial-to-parallel block 220, optional add L pilots block 225, inverse fast Fourier transform (IFFT) block 230, parallel-to-serial block 235, add cyclic prefix block 240, digital-to-analog converter (DAC) 245, RF upconverter 250, and antenna 255.

It should be noted that, in an advantageous embodiment of the present invention, most of the circuit blocks in coded OFDM transmitter 200 (i.e., up to DAC 245) are implemented using a digital signal processor (DSP). DAC 245 converts the digital output of the DSP to an analog signal and RF upconverter 250 upconverts the analog signal to a radio frequency (RF) signal. Additionally, it is assumed for the sake of simplicity that binary phase shift keying is to be used. However, in alternate embodiments, BPSK 215 may be replaced by other modulation schemes, including quadrature phase shift keying (QPSK). It should also be noted that the use of 4-state RSC encoding is by way of illustration only. In alternate embodiments of the present invention, other types of error-correction codes may be used.

Initially, four-state recursive systematic convolutional (RSC) encoder 205 receives the binary input, u, which comprises systematic data bits. RSC encoder 205 adds correction code bits (e.g., parity bits) and outputs the vector output, v. Random interleaver 210 reorders the vector, v, to produce the vector, v'. It is the nature of frequency-selective fading in the intersymbol interference (ISI) channel that a frequency fade on one sub-channel carrier is likely to also cause fades on the immediately adjacent sub-channel carriers as well. Thus, if the OFDM transmitter maps adjacent data bits onto adjacent sub-channel carriers, a fade on several adjacent sub-channels may cause bit errors on several adjacent transmitted data bits.

However, conventional error correction schemes (e.g., RSC encoding) work best when bit errors are randomly dispersed in the received data bits. Adjacent bit errors are less likely to be correctable. To avoid this problem, interleaver 210 rearranges the data bits in the vector, v, so that adjacent data bits are not mapped onto adjacent sub-channel carriers. In order to reverse the process, the coded OFDM receiver must know the manner in which interleaver 210 re-arranges the data bits being transmitted. It is noted that the proposed blind iterative algorithm operates properly even if random interleaving is not used. Therefore, interleaving is not essential to the operation of the present invention. However, the use of random interleaving improves the bit error rate of a coded OFDM receiver using the iterative algorithm according to the principles of the present invention.

Binary phase shift keying (BPSK) block 215 modulates the randomized vector, v', onto N sub-channel carriers. Serial-to-parallel block 220 converts the serial output of BPSK 215 into a parallel data suitable for processing by IFFT block 230. Optionally, pilot channel signals may be added to the BPSK modulated sub-channel carriers from BPSK 215 (this is explained below in greater detail). IFFT block 230 operates on blocks of vector data, X, from BPSK 215 and converts the vector data X (including pilot signals, if any) from frequency domain signals to time domain signals.

Parallel-to-serial block 235 re-serializes the parallel output of frequency domain signals from IFFT block 230. The output of parallel-to-serial block 235 is the vector output, x. Cyclic prefix block 240 then adds a cyclic prefix to the vector, x, to produce the vector output, $x^{cp}$. DAC 245 converts the digital output from cyclic prefix block 240 to an analog signal, which is then upconverted to a coded OFDM-modulated RF signal by RF converter 250. The coded OFDM signal is transmitted by antenna 255 into the ISI channel.

Figure 3:
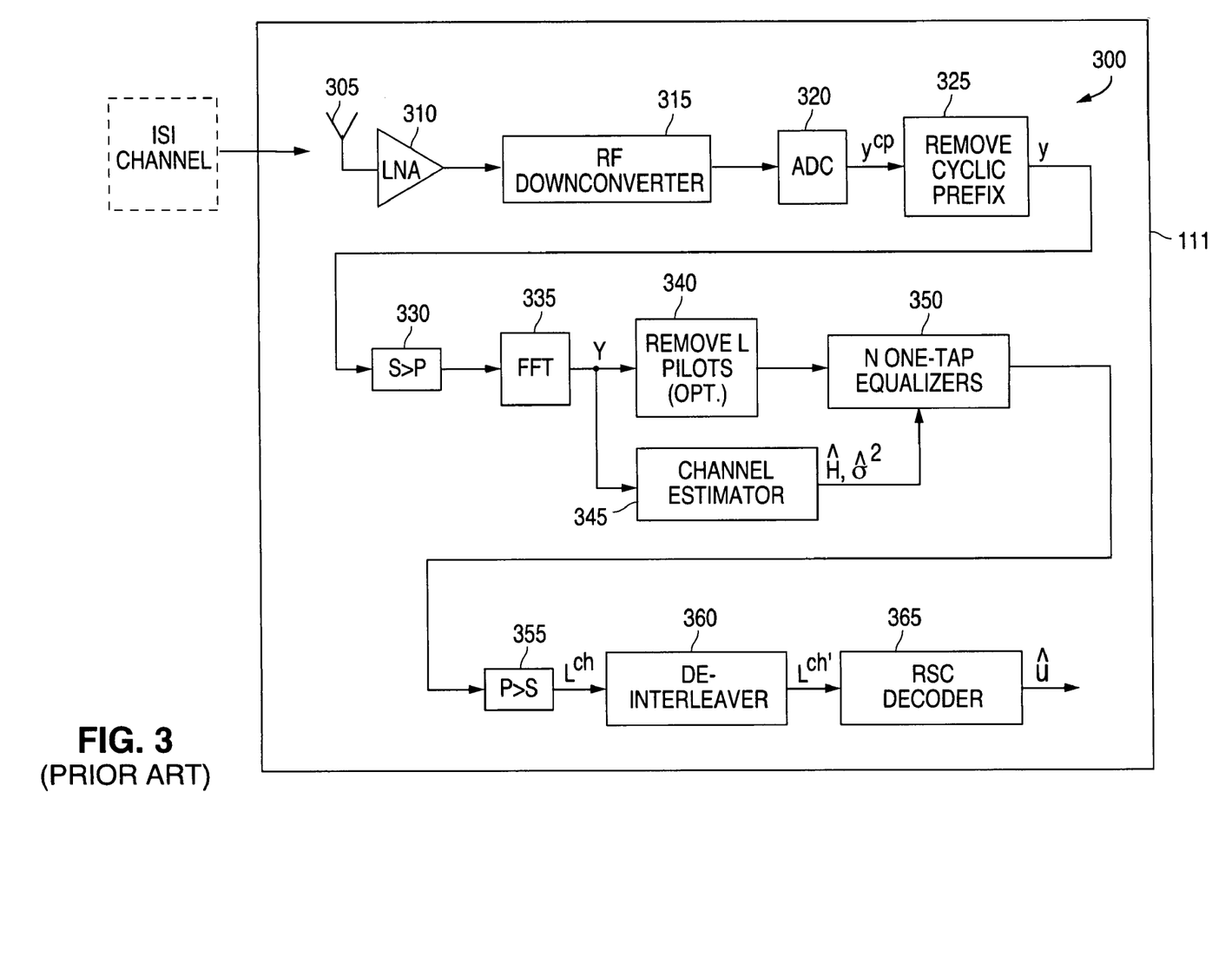
FIG. 3 is a high-level block diagram of a conventional coded orthogonal frequency division multiplexing (OFDM) receiver according to an exemplary embodiment of the prior art.

FIG. 3 is a high-level block diagram of conventional coded orthogonal frequency division multiplexing (OFDM) receiver 300 in mobile station 111 according to an exemplary embodiment of the prior art. Prior art coded OFDM receiver 300 comprises antenna 305, low-noise amplifier (LNA) 310, RF downconverter 315, analog-to-digital converter (ADC) 320, remove cyclic prefix block 325, serial-to-parallel converter block 330, fast Fourier transform (FFT) block 335, optional remove L pilots block 340, channel estimator 345, N one-tap equalizers block 350, parallel-to-serial block 355, de-interleaver 360, and RSC decoder 365.

Coded OFDM receiver 300 receives the coded OFDM signal from the ISI channel via antenna 305. LNA 310 amplifies the incoming coded OFDM signal received from antenna 305 to a level suitable for RF downconverter 315. RF downconverter 315 downconverts the coded OFDM signal to an intermediate frequency signal comprising the N sub-channel carriers, including the cyclic prefix. ADC 320 digitizes the intermediate frequency signal to produce the vector output $y^{cp}$. Remove cyclic prefix block 325 removes the cyclic prefix added by OFDM transmitter 200, thereby isolating the N sub-channel carriers in the vector output, y.

Serial-to-parallel converter block 330 converts the vector, y, to parallel data suitable for processing by fast Fourier transform (FFT) block 335. FFT block 335 converts the time domain data in vector y to frequency domain data in the output vector, Y. Next, optional remove L pilots block 340 removes the L pilot channel signals, if any from vector Y. Also, channel estimator 345 performs channel estimation using the vector Y, including the pilot channel signals therein. Channel estimator 345 produces a plurality of weighting coefficient outputs, including the vector, $\hat{H}$, and the noise variance value, $\hat{\sigma}^2$. Each of the N one-tap equalizers in N one-tap equalizers block 350 receives and equalizes one of the N sub-channel carriers in the vector Y using a corresponding one of the values in $\hat{H}$ and $\hat{\sigma}^2$. Typically, $\hat{\sigma}^2$ is the same for all sub-channels. However, in some cases, $\hat{\sigma}^2$ may be different for different sub-channels.

Parallel-to-serial block 355 re-serializes the output of N one-tap equalizers block 350 to produce the vector output $L^{ch}$, which contains the received systematic bits and error-correction bits in soft format. De-interleaver 360 reverses the process performed by interleaver 210, thereby putting the systematic bits and error correction bits back in the correct order and producing the vector output $L^{ch'}$. RSC decoder 365 performs error correction and outputs the data stream û, which ideally should be the same as the original binary input, u, in prior art OFDM transmitter 200.

The present invention improves on the channel estimation performed by prior art OFDM receiver 300 by means of an iterative apparatus and related method that perform joint soft decoding and channel estimation. The new iterative technique provides an accurate blind or semi-blind channel estimate within a single OFDM symbol. An OFDM receiver according to the principles of the present invention uses the minimum number of pilots, if any (none in the blind case), has zero latency, and is highly suitable for fast time-varying channels.

Figure 4:
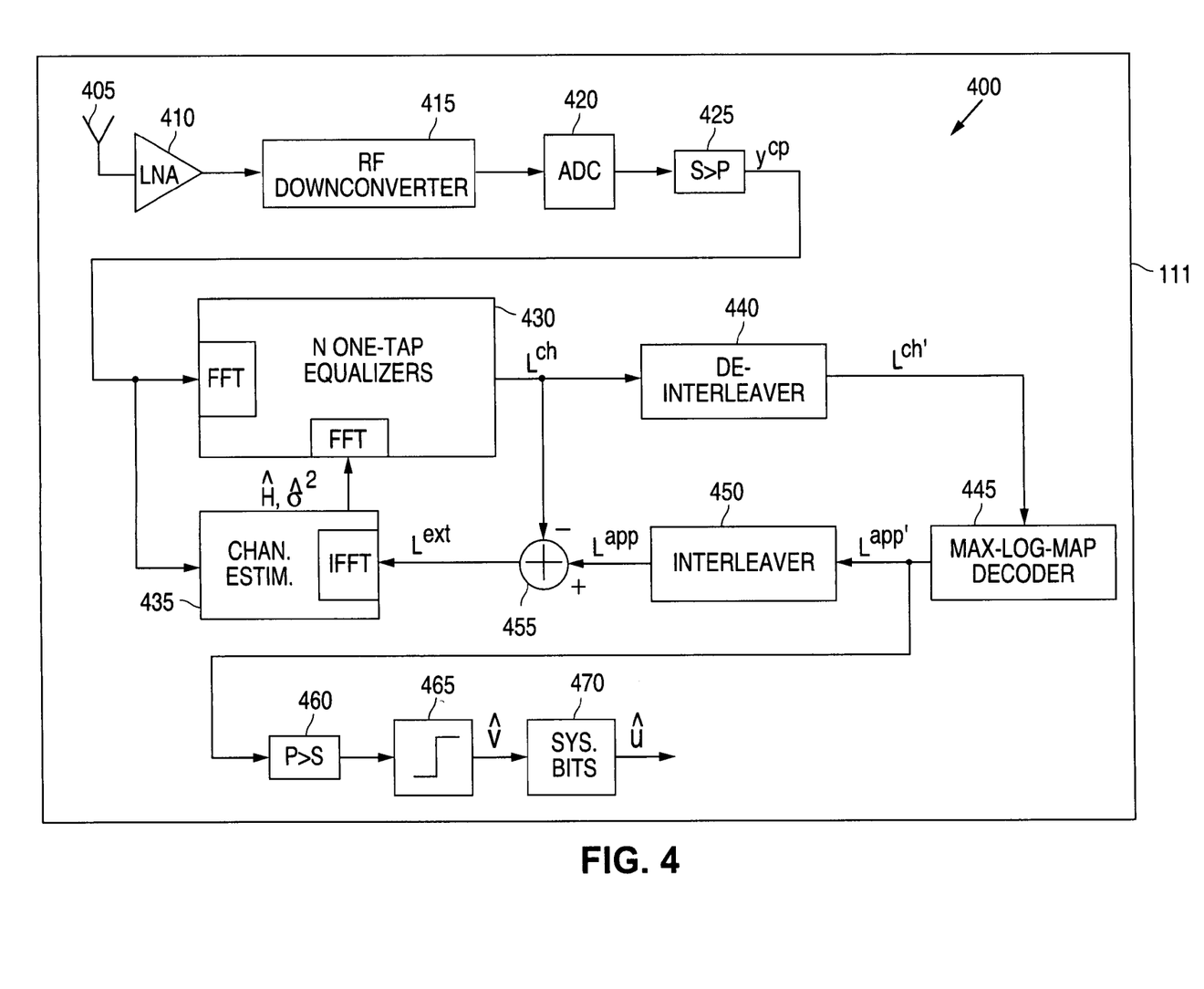
FIG. 4 is a high-level block diagram of a coded orthogonal frequency division multiplexing (OFDM) receiver for use in the wireless network in FIG. 1 according to an exemplary embodiment of the present invention.

FIG. 4 is a high-level block diagram of coded orthogonal frequency division multiplexing (OFDM) receiver 400 for use in mobile station 111 according to an exemplary embodiment of the present invention. Coded OFDM receiver 400 comprises antenna 405, low-noise amplifier (LNA) 410, RF downconverter 415, analog-to-digital converter (ADC) 420, serial-to-parallel converter block 425, N one-tap equalizers block 430, channel estimator 435, de-interleaver 440, Max-Log-Map decoder 445, interleaver 450, adder 455, parallel-to-serial block 460, threshold device 465, and systematic bits block 470. It should be noted that, in an advantageous embodiment of the present invention, most of the circuit blocks in coded OFDM receiver 400 (i.e., blocks after ADC 425) may be implemented using a digital signal processor (DSP).

Coded OFDM receiver 400 receives the coded OFDM signal from the ISI channel via antenna 405. LNA 410 amplifies the incoming coded OFDM signal received from antenna 405 to a level suitable for RF downconverter 415. RF downconverter 415 downconverts the coded OFDM signal to an intermediate frequency signal comprising the N sub-channel carriers, including the cyclic prefix. ADC 420 digitizes the intermediate frequency signal to produce a vector output that contains the cyclic prefix. Unlike prior art coded OFDM receiver 300, the cyclic prefix is not removed from the received coded OFDM signal. Coded OFDM receiver 400 uses the cyclic prefix information to assist in performing channel estimation according to the principles of the present invention.

Serial-to-parallel block 425 converts the digitized serial data output from ADC 420 to produce the parallel data vector output $y^{cp}$. All circuit blocks following N one-tap equalizers block 430 and channel estimator 435 operate in the frequency domain. Therefore, the inputs of N one-tap equalizers block 430 comprise fast Fourier transform (FFT) stages that convert the time domain vector $y^{cp}$ (after removing the cyclic prefix part) and the $\hat{h}$ values from channel estimator 435 to frequency domain values. Channel estimator 435 operates in the time domain and uses an input comprising an inverse fast Fourier transform (IFFT) stage that converts frequency domain signals from adder 455 to time domain signals.

Channel estimator 435 performs channel estimation in the time domain in order to benefit from the information in the cyclic prefix portion of the received coded OFDM signal and the channel delay spread constraint. The tap weighting coefficients are time domain signals that are later transformed to frequency domain to obtain the values of the weighting coefficients for the N single-tap equalizers.

Each of the N one-tap equalizers in N one-tap equalizers block 430 receives and equalizes one of the N sub-channel carriers in the vector Y using a corresponding one of the values in $\hat{H}$ and $\hat{\sigma}^2$. The equalized vector output $L^{ch}$ from N one-tap equalizers block 430 is sent to de-interleaver 440 and to a negative input of adder 455. De-interleaver 440, operating in the frequency domain, reverses the process performed by interleaver 210, thereby putting the soft information corresponding to the systematic bits and error correction bits back in the correct order and producing the vector output $L^{ch'}$.

Max-Log-Map decoder 445 performs soft error correction and outputs the vector $L^{app'}$ of a posteriori soft values. Interleaver 450 re-arranges the elements of $L^{app'}$ in the same manner as interleaver 210 in transmitter 200 to produce the interleaved vector Lapp of a posteriori values. Thus, the order of the sub-channel carriers in $L^{ch}$ and $L^{app}$ correspond. Adder 455 subtracts $L^{ch}$ from $L^{app}$ to produce the vector of extrinsic soft values $L^{ext}$. Channel estimator 435 uses the vector $L^{ext}$ along with $y^{cp}$ to produce the $\hat{h}$ and $\hat{\sigma}^2$ signals.

The vector $L^{app'}$ is converted from parallel data to serial data by parallel-to-serial block 460. Threshold device 465 converts the soft a posteriori decisions at the serial data output of parallel-to-serial block 460 to produce the hard decisions output $\hat{v}$, which contains the originally transmitted systematic bits and error-correction bits. Systematic bits block 470 then removes the error-correction bits to produce the output $\hat{u}$.

The operation of coded OFDM receiver 400 may be better understood from the following explanation.

RSC encoder 205 is assumed to be a 4-state recursive systematic convolutional (RSC) encoder with the generator matrix $$G(D)=[1(1+D^2)/(1+D+D^2)], \quad \text{(Eqn. 1)}$$

where D is a delay operator. The output of RSC encoder 205 may be written as:

$$[u(D)p(D)]=u(D)\cdot[1(1+D^2)/(1+D+D^2)] \quad \text{(Eqn. 2)}$$

where u(D) and p(D) represent the sequences of systematic and parity bits, respectively. Each of these sequences has a length K=r·N, where r=½ is the code rate, and N is the number of sub-channel carriers (or simply sub-channels).

If v represents the multiplexed output vector of length N with $v_{2k}=u_k$, and $v_{2k+1}=p_k$, where k=0, 1, . . . , K−1, then the BPSK modulated vector may be represented as:

$$X=(2v'-1)=Qx \quad \text{(Eqn. 3)}$$

In Equation 3, v' is the interleaved version of v, and Q is an N×N Discrete Fourier Transform (DFT) matrix.

Let $$y^{cpT}=[\underline{y}^T y^T] \quad \text{(Eqn. 4)}$$

be the output of the channel of length N+v, where $\underline{y}$ is the cyclic prefix observation of length v and y is the remaining part of length N. The value of y may be obtained using the cyclic convolution:

$$y=h\circledast x+n. \quad \text{(Eqn. 5)}$$

In Equation 5, h is the channel impulse response, and n is a complex additive white Gaussian noise (AWGN) vector with the covariance matrix $R_{nn}=\sigma^2 I_{N\times N}$. Also, Y may be represented as:

$$Y=diag(H)X+N, \quad \text{(Eqn. 6)}$$

where: X=Qx; Y=Qy; N=Qn; and H=Vh. V is an N×L Vandermonde matrix with elements given by:

$$V_{n,l}=e^{-j(2\pi/N)nl} \quad \text{(Eqn. 7)}$$

for n=0, 1, . . . , N−1 and l=0, 1, . . . , L−1.

It is assumed that h can have up to L non-zero complex taps from 0 to v=L−1 and that it is fixed over the period of a single ODFM symbol.

For the $j^{th}$ OFDM symbol, Equation 6 may be written as:

$$Y_j=diag(X_j)H_j+N_j, \quad \text{(Eqn. 8)}$$

$$Y_j = diag(X_j)Vh_j + N_j. \qquad \text{(Eqn. 9)}$$

Also, the cyclic prefix of the $j^{th}$ OFDM symbol may be written as:

$$\underline{y}_j = \underline{xx}_j h_j + \underline{n}_j, \qquad \text{(Eqn. 10)}$$

where $\underline{xx}_j$ is the following toeplitz matrix of the cyclic prefix parts of $x_j^{cp}$ and $x_{j-1}^{cp}$:

$$\underline{xx}^j = \begin{bmatrix} x_0^j & x_{\nu-1}^{j-1} & x_{\nu-2}^{j-1} & \cdots & x_0^{j-1} \\ x_1^j & x_0^j & x_{\nu-1}^{j-1} & \cdots & x_1^{j-1} \\ \vdots & \vdots & \ddots & \ddots & \vdots \\ x_{\nu-1}^j & x_{\nu-2}^j & \cdots & x_0^j & x_{\nu-1}^{j-1} \end{bmatrix}. \qquad \text{(Eqn. 11)}$$

Equations 9 and 10 may be combined as follows:

$$\begin{bmatrix} \underline{y}_j \\ Y_j \end{bmatrix} = \begin{bmatrix} xx_j \\ diag(X_j)V \end{bmatrix} h_j + \begin{bmatrix} n_j \\ N_j \end{bmatrix}, \text{ and} \qquad \text{(Eqn. 12)}$$

$$y_j = A_j h_j + N_j. \qquad \text{(Eqn. 13)}$$

The present invention provides a low-complexity iterative algorithm for finding a good-quality sub-optimal solution to the joint maximum likelihood (ML) channel/data estimation problem, which may be stated as follows:

$$(\hat{X}_j, \hat{H}_j) = \underset{\tilde{X}_j, \tilde{H}_j}{\operatorname{argmax}} \{p(Y_j | \tilde{X}_j, \tilde{H}_j)\} \qquad \text{(Eqn. 14)}$$

Iterative Joint Decoding and Channel Estimation

FIG. 4 shows a block diagram of the proposed iterative algorithm, which is briefly described in the steps shown below. Since the noise variance does not usually vary too fast, for simplicity we will assume that $\sigma^2$ is known to the receiver (i.e., $\hat{\sigma}^2 = \sigma^2$) In practice, once the channel and data have been estimated for the $j^{th}$ OFDM symbol, $\hat{\sigma}^2$ can be calculated as follows:

$$\hat{\sigma}_j^2 = \alpha\hat{\sigma}_{j-1}^2 + (1-\alpha)\frac{1}{N}\sum_{i=0}^{N-1} |Y_i^j - \hat{H}_i^j \hat{X}_i^j|^2, \qquad \text{(Eqn. 15)}$$

where $\alpha$ is an exponential smoothing factor. The value $\sigma_j^2$ is used as an estimate of $\sigma^2$ for the next symbol.

Step 1—The present invention finds the initial channel estimate, $\hat{h}^{(it=0)}$, which is simply random in the blind case, and in the semi-blind case can be obtained as:

$$\hat{h}^{(it=0)} = \frac{1}{\sqrt{L}}Q_L^H H^P. \qquad \text{(Eqn. 16)}$$

In Equation 16, $H^P$ is an L×1 vector of the gain estimates ($H_i^P = Y_i^P/X_i^P$) of the uniformly spaced L pilot subchannels and $Q_L$ is an L×L discrete Fourier Transform (DFT) matrix (the superscript ($^H$) denotes the conjugate transpose operation). Therefore, $$H^{(it=0)} = V\hat{h}^{(it=0)}, \qquad \text{(Eqn. 17)}$$

where V is the N×L Vandermonde matrix from Equation 7 above.

Step 2—Given $H^{(it)}$, the present invention equalizes the received vector Y using N parallel single-tap equalizers and obtains the extrinsic channel log-likelihood ratios $L^{ch(it+1)}$ as follows:

$$L_i^{ch(it+1)} = \log \frac{p(Y_i | \hat{H}_i^{(it)}, X_i = +1)}{p(Y_i | \hat{H}_i^{(it)}, X_i = -1)}, \qquad \text{(Eqn. 18)}$$

$$L_i^{ch(it+1)} = \frac{2}{\sigma^2}|\hat{H}_i^{(it)}|^2 \cdot \operatorname{Re}\left\{\frac{Y_i}{\hat{H}_i^{(it)}}\right\}, \qquad \text{(Eqn. 19)}$$

where $i = 0, 1, \ldots, N-1$.

Step 3—According to the principles of the present invention, coded OFDM receiver 400 performs soft MAP sequence estimation, using the well-known Max-Log-Map algorithm performed by Max-Log-Map decoder 445. The Max-Log-Map algorithm is less complex and numerically more stable for practical implementations compared to, for example, the Log-Map algorithm. The Max-Log-Map algorithm also results in better performance of the iterative algorithm performed by the present invention, because the Max-Log-Map algorithm provides optimal MAP sequence estimation (or OFDM symbol estimation) compared to the optimal MAP BPSK symbol estimation provided by the Log-Map algorithm. Moreover, the Max-Log-Map algorithm is more robust against channel estimation errors.

The extrinsic log-likelihood ratios (LLRs) for the coded bits $L^{ext}$ may be obtained as follows:

$$L^{ext(it+1)} = L^{app(it+1)} - L^{ch(it+1)}. \qquad \text{(Eqn. 20)}$$

In Equation 20, Lapp is the interleaved version of the a posteriori log likelihood ratios (LRLs) vector for the coded bits $L^{app'}$, whose entries are obtained as follows:

$$L_{2k}^{app'} = \max_{(l',l) \in B(u_k=1)}[S+T+U] - \max_{(l',l) \in B(u_k=0)}[S+T+U], \text{ and} \qquad \text{(Eqn. 21)}$$

$$L_{2k+1}^{app'} = \max_{(l',l) \in B(p_k=1)}[S+T+U] - \max_{(l',l) \in B(p_k=0)}[S+T+U]. \qquad \text{(Eqn. 22)}$$

In Equations 21 and 22, $S = \bar{\alpha}_{k-1}(l')$, $T = \bar{\gamma}_k(l',l)$, and $U = \bar{\beta}_k(l)$, where k = 0, 1, ..., K−1, (l'l) is the branch from state l' to state l, and (l'l) = 0, 1, ..., $M_s$−1.

The value $M_s$ is the number of states in the trellis of the code. $B(u_k=0(1))$ is the set of branches in the $k^{th}$ section of the trellis with $u_k=0(1)$. Similarly, $B(p_k=0(1))$ is the set of branches in the $k^{th}$ section of the trellis with $p_k=0(1)$.

After appropriate normalizations, the branch metrics $\bar{\gamma}_k$ can be written in terms of the a priori and channel LLRs as follows:

$$\bar{\gamma}_k(l', l) = u_k \cdot L_k^a + u_k \cdot L_{2k}^{ch'} + p_k \cdot L_{2k+1}^{ch'}. \quad \text{(Eqn. 23)}$$

In Equation 23, k=0, 1, . . . , K−1, and $$L_k^a = \frac{p(u_k = 1)}{p(u_k = 0)} \quad \text{(Eqn. 24)}$$

is the a priori LLR of $u_k$ and is assumed to be zero unless some a priori information for $u_k$ is available, such as that provided by another code in serial or parallel concatenation.

$$\bar{\alpha}_k(l) = \max_{l'}\{\bar{\alpha}_{k-1}(l') + \bar{\gamma}_k(l', l)\}, \text{ and} \quad \text{(Eqn. 25)}$$

$$\bar{\beta}_k(l) = \max_{l'}\{\bar{\beta}_{k+1}(l') + \bar{\gamma}_{k+1}(l, l')\}. \quad \text{(Eqn. 26)}$$

In Equations 25 and 26,
k=0, 1, . . . , K−2,
$\bar{\alpha}_{-1}(l=0) = \bar{\beta}_{K-1}(l=0) = 0$, and
$\bar{\alpha}_{-1}(l) = \bar{\beta}_{K-1}(l) = -\infty$ for $l \neq 0$.

Step 4—The present invention uses the extrinsic soft output of Max-Log-Map decoder 445 to find the ML estimate of H. To take advantage of the cyclic prefix observation and channel length constraint, channel estimation is performed in the time domain.

The ML estimate of h can be obtain using the EM algorithm as:

$$\hat{h}_j^{(it+1)} = (E[A_j^H A_j | y_j, \hat{h}_j^{(it)}])^{-1} E[A_j | y_j, \hat{h}_j^{(it)}]^H y_j, \quad \text{(Eqn. 27)}$$

$$H_j^{(it+1)} = V\hat{h}_j^{(it+1)}. \quad \text{(Eqn. 28)}$$

It is noted that the term $E[A_j^H A_j | y_j, \hat{h}_j^{(it)}]$ can be viewed as an estimate of the a posteriori autocorrelation matrix of the transmitted sequence, which is approximately proportional to the identity matrix in the case of constant modulus modulation. Therefore, in that case, the matrix inversion in Equation 27 can be avoided and we can use the following approximation:

$$\hat{h}_j^{(u+1)} = \frac{1}{N+\nu}\left(E\left[A_j | Y_j, \hat{h}_j^{(u)}\right]\right)^H Y_j \quad \text{(Eqn. 29)}$$

This approximation is equivalent to estimating the channel by cross-correlating the received sequence with the soft estimate of the transmitted sequence, which can be obtained by:

$$E\left[A_j | Y_j, \hat{h}_j^{(u)}\right] = \begin{bmatrix} E\left[\underline{xx}_j | Y_j, \hat{h}_j^{(u)}\right] \\ diag\left(E\left[X_j | Y_j, \hat{h}_j^{(u)}\right]\right)V \end{bmatrix}, \quad \text{(Eqn. 30)}$$

where $$E\left[X_j | Y_j \hat{h}_j^{(u)}\right] = \tanh^{-1}\left(\frac{1}{2}L^{ext(u+1)}\right), \quad \text{(Eqn. 31)}$$

and $$E[x_j | y_j, \hat{h}_j^{(it)}] = Q^H E[X_j | y_j, \hat{h}_j^{(it)}], \quad \text{(Eqn. 32)}$$

$$E[x_{j-1}] = Q^H E[X_{j-1}] \quad \text{(Eqn. 33)}$$

Equation 33 indicates that the final soft estimate of the previous OFDM symbol is used during the iterative channel/data estimation of the current symbol. Simulation results show that error propagation has a negligible effect.

Step 5—Return to step 2, and repeat until a stopping criterion is reached.

Although the present invention has been described with several embodiments, various changes and modifications may be suggested to one skilled in the art. It is intended that the present invention encompass such changes and modifications as fall within the scope of the appended claims.

What is claimed is:

1. For use in a coded orthogonal frequency division multiplexing (OFDM) receiver, an apparatus for demodulating a coded OFDM signal comprising systematic bits, error control bits, and a cyclic prefix, wherein said apparatus performs channel estimation in a time domain using said error control bits and said cyclic prefix in said coded OFDM signal; wherein said apparatus comprises at least one equalizer that receives multiple samples of the coded OFDM signal and provides multiple equalized outputs.

2. The apparatus as set forth in claim 1 wherein said at least one equalizer comprises N equalizers that receive a first N samples of said coded OFDM signal and generate therefrom N equalized outputs, wherein said N equalized outputs are equalized according to a plurality of tap weighting coefficients applied to said N equalizers.

3. The apparatus as set forth in claim 2 wherein said apparatus further comprises a decoding circuit block that receives and error-corrects said N equalized outputs, wherein said decoding circuit block outputs N soft decision values, wherein each of said N soft decision values comprises a probability value associated with an estimated value of a data symbol in said coded OFDM signal.

4. The apparatus as set forth in claim 3 wherein said apparatus further comprises a channel estimator that receives said coded OFDM signal and generates said plurality of tap weighting coefficients applied to said N equalizers, wherein said channel estimator generates said plurality of tap weighting coefficients as a function of said received coded OFDM signal, including said cyclic prefix, and said N soft decision values.

5. The apparatus as set forth in claim 4 wherein said decoding circuit block determines said N soft decision values as a function of said error control bits and systematic data bits in said coded OFDM signal.

6. The apparatus as set forth in claim 5 wherein said apparatus further comprises circuitry for determining a difference between each of said N equalized outputs and a corresponding one of said N soft decision values and outputting N difference values.

7. The apparatus as set forth in claim 6 wherein said circuitry for determining said difference between said each one of said N equalized outputs and said corresponding soft decision value subtracts said each one of said N equalized outputs from said corresponding soft decision value.

8. The apparatus as set forth in claim 7 wherein said channel estimator receives said N difference values and generates said plurality of tap weighting coefficients as a function of said received coded OFDM signal, including said cyclic prefix, and said N difference values.

9. The apparatus as set forth in claim 7 wherein said N equalizers perform equalization in the frequency domain and said N equalized outputs comprise frequency domain signals.

10. The apparatus as set forth in claim 7 wherein said channel estimator performs channel estimation in the time domain and said tap weighting coefficients are time domain signals.

11. A coded orthogonal frequency division multiplexing (OFDM) receiver comprising:
 a radio frequency (RF) front-end that receives an incoming RF signal and down converts and digitizes said RF signal to produce a coded OFDM signal comprising systematic bits, error control bits, and a cyclic prefix; and
 an apparatus for demodulating said coded OFDM signal, wherein said apparatus performs channel estimation in a time domain using said error control bits and said cyclic prefix in said coded OFDM signal.

12. The coded OFDM receiver as set forth in claim 11 wherein said apparatus comprises N equalizers that receive a first N samples of said coded OFDM signal and generate therefrom N equalized outputs, wherein said N equalized outputs are equalized according to a plurality of tap weighting coefficients applied to said N equalizers.

13. The coded OFDM receiver as set forth in claim 12 wherein said apparatus further comprises a decoding circuit block that receives and error corrects said N equalized outputs, wherein said decoding circuit block outputs N soft decision values, wherein each of said N soft decision values comprises a probability value associated with an estimated value of a data symbol in said coded OFDM signal.

14. The coded OFDM receiver as set forth in claim 13 wherein said apparatus further comprises a channel estimator that receives said coded OFDM signal and generates said plurality of tap weighting coefficients applied to said N equalizers, wherein said channel estimator generates said plurality of tap weighting coefficients as a function of said received coded OFDM signal, including said cyclic prefix and said N soft decision values.

15. The coded OFDM receiver as set forth in claim 14 wherein said decoding circuit block determines said N soft decision values as a function of said error control bits and systematic data bits in said coded OFDM signal.

16. The coded OFDM receiver as set forth in claim 15 wherein said apparatus further comprises circuitry for determining a difference between each of said N equalized outputs and a corresponding one of said N soft decision values and outputting N difference values.

17. The coded OFDM receiver as set forth in claim 16 wherein said circuitry for determining said difference between said each one of said N equalized outputs and said corresponding soft decision value subtracts said each one of said N equalized outputs from said corresponding soft decision value.

18. The coded OFDM receiver as set forth in claim 17 wherein said channel estimator receives said N difference values and generates said plurality of tap weighting coefficients as a function of said received coded OFDM signal, including said cyclic prefix, and said N difference values.

19. The coded OFDM receiver as set forth in claim 17 wherein said N equalizers perform equalization in the frequency domain and said N equalized outputs comprise frequency domain signals.

20. The coded OFDM receiver as set forth in claim 17 wherein said channel estimator performs channel estimation in the time domain and said tap weighting coefficients are time domain signals.

21. For use in a coded orthogonal frequency division multiplexing (OFDM) receiver, a method of demodulating a coded OFDM signal comprising systematic bits, error control bits, and a cyclic prefix, the method comprising the steps of:
 performing channel estimation in a time domain using the error control bits and the cyclic prefix in the coded OFDM signal, and performing channel equalization comprising receiving multiple samples of the coded OFDM signal and providing multiple equalized outputs based on the samples.

22. The method as set forth in claim 21 wherein the step of performing channel equalization comprises the sub-steps of:
 receiving a first N samples of the coded OFDM signal; and
 generating therefrom N equalized outputs, wherein the N equalized outputs are equalized according to a plurality of tap weighting coefficients.

23. The method as set forth in claim 22 further comprising the steps of:
 error-correcting the N equalized outputs; and
 generating from the error-corrected N equalized outputs N soft decision values, wherein each of the N soft decision values comprises a probability value associated with an estimated value of a data symbol in the coded OFDM signal.

24. The method as set forth in claim 23 further comprising the step of generating from the coded OFDM signal the plurality of tap weighting coefficients as a function of the coded OFDM signal, including the cyclic prefix, and the N soft decision values.

25. The method as set forth in claim 24 further comprising the step of determining the N soft decision values as a function of the error control bits and systematic data bits in the coded OFDM signal.

\* \* \* \* \*

UNITED STATES PATENT AND TRADEMARK OFFICE
CERTIFICATE OF CORRECTION

PATENT NO.       : 7,633,849 B1                                              Page 1 of 1
APPLICATION NO.  : 10/218094
DATED            : December 15, 2009
INVENTOR(S)      : Al-Rawi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Twenty-first Day of December, 2010

David J. Kappos
*Director of the United States Patent and Trademark Office*